United States Patent [19]

Houlgrave

[11] Patent Number: 4,721,132
[45] Date of Patent: Jan. 26, 1988

[54] SUBSEA FLOWLINE QUICK DISCONNECT COUPLING

[75] Inventor: Robert C. Houlgrave, Houston, Tex.

[73] Assignee: Hughes Tool Company, Houston, Tex.

[21] Appl. No.: 11,163

[22] Filed: Feb. 4, 1987

[51] Int. Cl.⁴ .............................................. F16L 37/28
[52] U.S. Cl. .............................. 137/614.06; 166/321; 166/332; 251/250; 285/18
[58] Field of Search .................. 137/614.06; 251/250; 285/18, 316; 166/321, 332

[56] References Cited

U.S. PATENT DOCUMENTS

| | | | |
|---|---|---|---|
| 2,125,330 | 8/1938 | Brisbane | 251/250 |
| 2,948,553 | 8/1960 | Gill | 137/614.02 |
| 3,035,808 | 5/1962 | Knox | 251/250 |
| 3,276,474 | 10/1966 | Gill | 137/614.03 |
| 3,358,708 | 12/1967 | Williams | 137/614.06 |
| 3,382,892 | 3/1965 | Cerbin | 137/614.02 |
| 3,847,413 | 11/1974 | Gurley et al. | 285/316 |
| 3,870,104 | 3/1975 | Mott | 285/18 |
| 4,181,149 | 1/1980 | Cox | 137/614.02 |
| 4,351,351 | 9/1982 | Flory et al. | 137/614.03 |
| 4,422,618 | 12/1983 | Lawson | 251/58 |
| 4,441,742 | 4/1984 | Owens, III | 285/18 |
| 4,453,566 | 6/1984 | Henderson, Jr. et al. | 137/614.02 |

FOREIGN PATENT DOCUMENTS 908475 4/1954 Fed. Rep. of Germany ...... 251/250

Primary Examiner—A. Michael Chambers
Attorney, Agent, or Firm—James E. Bradley

[57] ABSTRACT

A quick disconnect coupling for a subsea well flowline has valves that open and close when the coupling is made up and released. The coupling has tubular upper and lower connectors, each with a flow passage. The upper connector inserts over a mandrel of the lower connector. Ball valves are located in the passage of each connector. A latch member engages the mandrel when moved by a hydraulically actuated piston and a cam. A gear assembly connected with the piston simultaneously moves the upper ball valve to the closed position. A gear assembly connected with the lower ball valve simultaneously opens the lower ball valve when the upper connector latches to the lower connector.

3 Claims, 6 Drawing Figures

SUBSEA FLOWLINE QUICK DISCONNECT COUPLING

BACKGROUND OF THE INVENTION

1. Field of the Invention:

This invention relates in general to quick disconnect couplings, and in particular to a coupling for subsea flowlines that has valves in each connection and which close when the coupling is released.

2. Description of the Prior Art:

In floating platform subsea well production operations, fluids produced from the well flow under pressure through a riser to a floating production platform at the surface. Also, pressurized fluids are delivered from the floating vessel at the surface through the riser to the subsea well for various control and monitoring purposes. In floating production, there is always the possibility of a voluntary or involuntary move of location, due to, for example, ship or iceberg collision aviodance, anchor dragging or line breaking and severe storms. Quick disconnect couplings have been mounted to the vessels in the past to quickly disconnect the floating production facility from its flowlines, if the need arises, while avoiding the spillage of any well fluids. In these devices, valves are hydraulically actuated to close the lower coupling and the upper coupling in such circumstance.

While successful, the valves and hydraulic controls associated with the coupling make it expensive. Also, there is a fairly long distance between the upper and lower valves, which results in the fluid located between the valves spilling when the coupling is disconnected.

SUMMARY OF THE INVENTION

The coupling has tubular upper and lower connectors. Each of the connectors has a flow passage extending through them. The lower connector has an upwardly facing mandrel over which the upper connector seats.

Ball valves are located in the passage of each connector. A rotating means is mounted to each ball valve for moving each ball valve between open and closed positions. A latch member is mounted into the upper connector for engaging the mandrel of the lower connector. A cam moves in response to hydraulic pressure to move the latch member into and out of engagement with the mandrel. The rotating means of the upper valve moves simultaneously with the cam means to open the upper valve when the cam means moves the latch member into engagement with the mandrel. The cam means also causes the rotating means for the lower valve to open the lower valve when moving the latch member into engagement with the mandrel.

BRIEF DESCRIPTION OF THE DRAWINGS

FIG. 2c is a view of the lower portion of the coupling of FIGS. 1a, 1b, and 1c, shown in the closed position and with the upper portion of the coupling removed.

DESCRIPTION OF THE PREFERRED EMBODIMENT

Figure 1A:
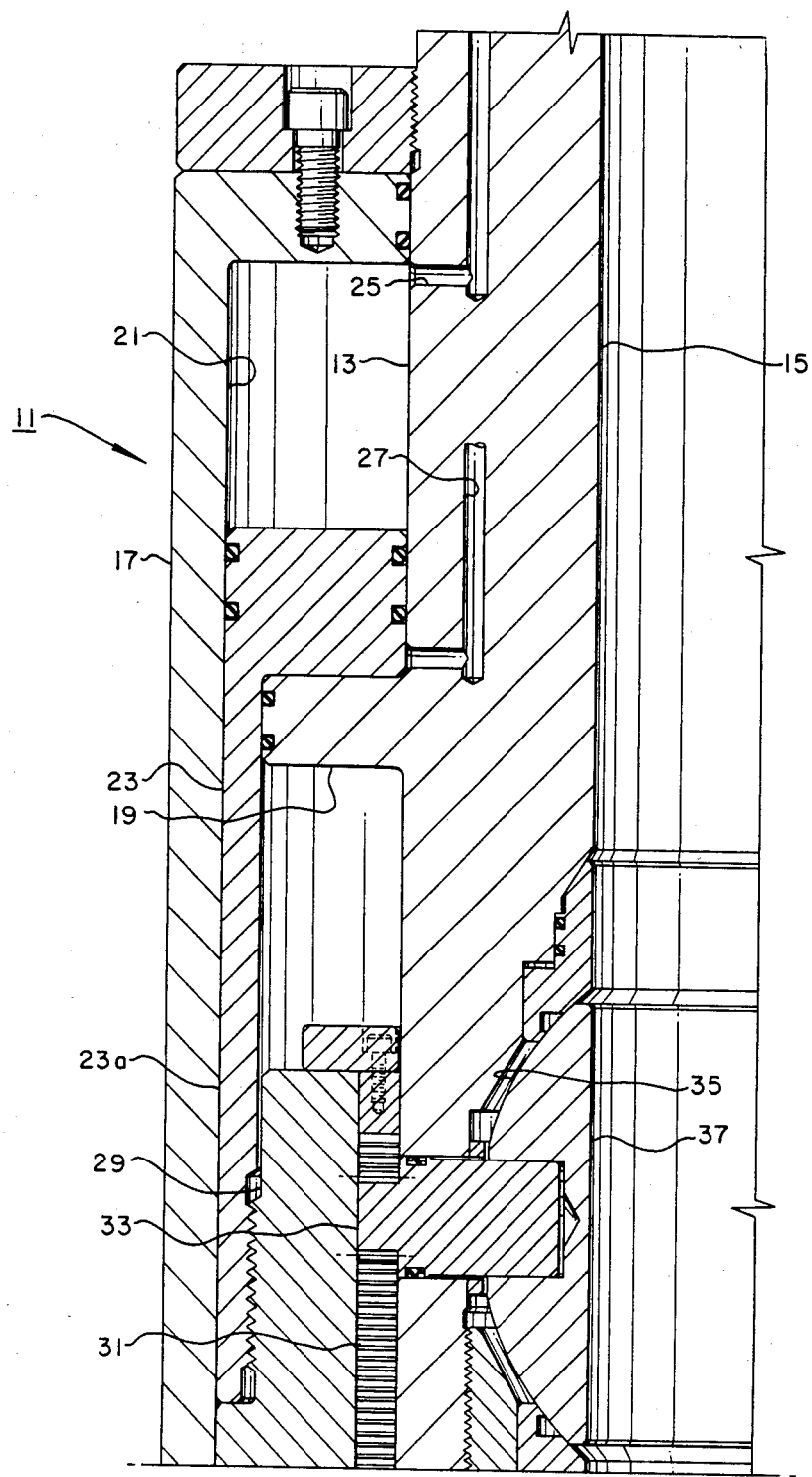
FIGS. 1a, 1b and 1c are partial vertical sectional views of a coupling constructed in accordance with this invention.

Referring to FIG. 1a, the coupling includes an upper connector 11 which is fixed to the floating production vessel (not shown) at the surface. The upper connector 11 has means (not shown) on its upper end for connection to various pipes leading to the process and control equipment on the vessel. The upper connector 11 has a tubular inner housing 13. Housing 13 has an axial passage 15 that extends completely through it for the passage of production fluids from the well to the surface. An outer housing 17 having a larger inner diameter than the outer diameter of inner housing 13, is mounted about the inner housing 13. The inner housing 13 has an external flange 19 that is located within the outer housing 17. A hydraulic chamber 21 is defined by the inner and outer housings 13 and 17.

A hydraulic piston 23 is carried in the chamber 21. The piston 23 moves between a lower position, shown in FIG. 1a, and an upper position shown in FIG. 2a. A hydraulic passage 25 is connected to hydraulic fluid supplied from the vessel for moving the piston 23 to the lower position. A hydraulic passage 27 is connected to a source of hydraulic fluid at the vessel for moving the piston 23 to the upper position. Piston 23 has a depending end 23a that extends between the flange 19 and the outer housing 17.

A tubular lower extension 29 is secured by threads to the depending end 23a. Lower extension 29 moves with the piston 23. An upper rack 31 is mounted to the lower extension 29 in a slot formed in the sidewall of the lower extension 29, so that is will move with the lower extension.

Figure 2A:
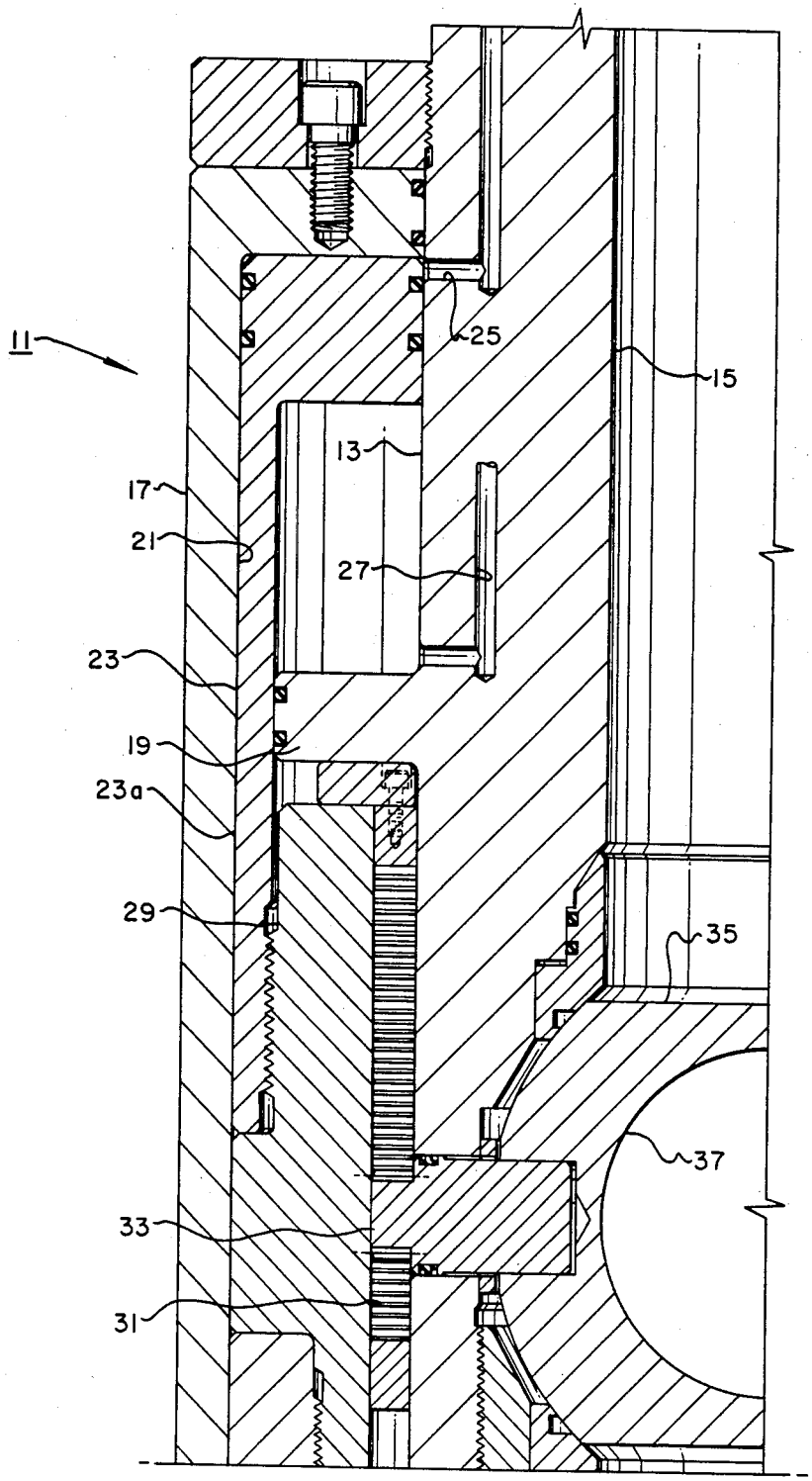
FIG. 2a is a view of the upper portion of the coupling of FIGS. 1a, 1b, and 1c, showing the upper ball valve in a closed position.

The upper rack 31 is a straight bar having gear teeth in meshing engagement with a pinion gear 33. Pinion gear 33 is rigidly mounted to an upper ball valve 35. When the upper rack 31 moves, it rotates the pinion gear 33, causing the ball valve 35 to move between open and closed positions. Ball valve 35 is located in the passage 15, and has a passage 37 which allows the production fluid to flow through the upper connector 11 when the upper ball valve 35 is in the open position. The closed position for the upper ball valve 35 is shown in FIG. 2a.

Figure 1B:
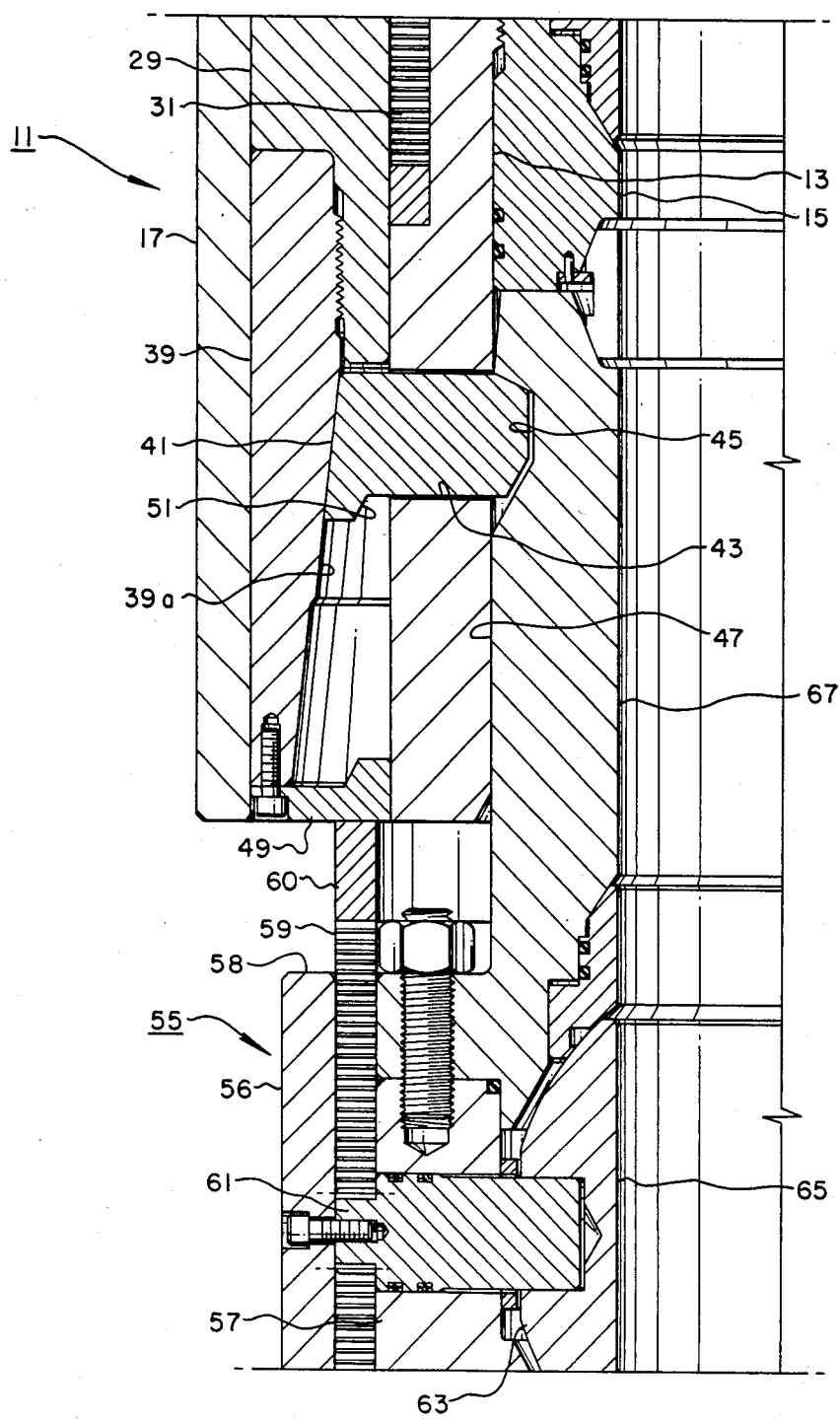
Figure 2B:
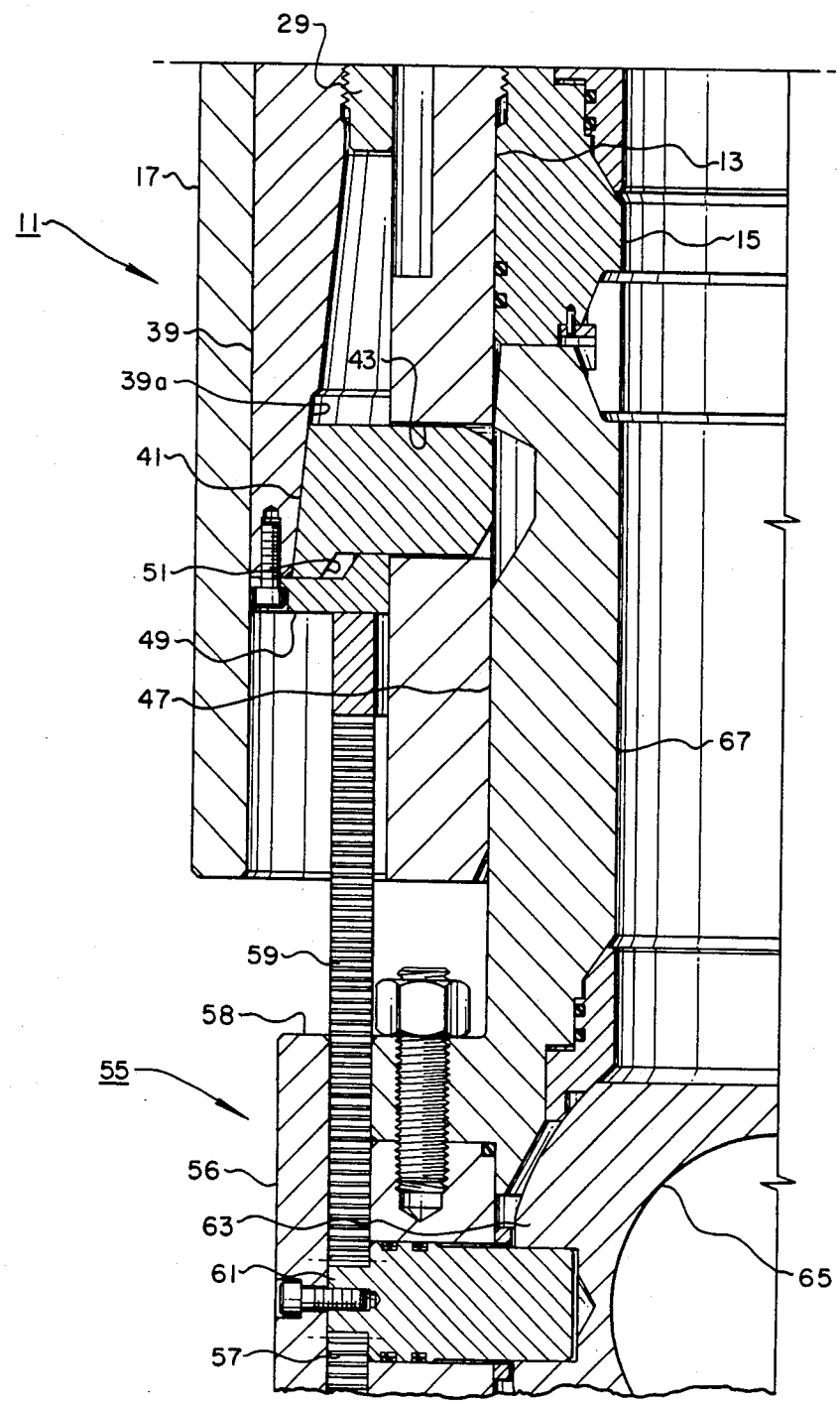
FIG. 2b is a view of the central portion of the coupling of FIGS. 1a, 1b, and 1c, showing the lower ball valve in a closed position.

Referring to FIG. 1b, a cam 39 is mounted to the lower end of the piston extension 29 by threads. Cam 39 is an annular tubular member having an inner inclined surface 39a. The inclined surface 39a engages a plurality of latch dogs 41 (only one shown) to move them to the engaged position shown in FIG. 1b. Each latch dog 41 is carried in a hole 43 in the inner housing 13. Each latch dog 41 will move radially between the engaged position (FIG. 1b) and an outer disengaged position (FIG. 2b). In the engaged position, the latch dogs 41 engage an annular groove 45 formed on the exterior of a mandrel 47.

Cam 39 has mounted to its lower end a release ring 49. When cam 39 is pulled upwardly with piston 23, release ring 49 contacts a depending lip 51 formed on each dog 41 to pull it from the groove 45. FIG. 2b shows the release ring 49 in contact with the lip 51, causing outward retracting movement of the latch dog 41.

Referring to FIG. 1b, a lower connector 55 is stationarily mounted to the upper end of the riser (not shown). The lower connector 55 has a housing 57 to which is bolted the mandrel 47. Housing 57 has an external upwardly facing shoulder 58. A lower rack 59 is reciprocally carried in an annular passage in the housing 57. The lower rack 59 is a bar containing gear teeth and located in a slot in a reciprocable cylinder 60. The upper end of cylinder 60 protrudes above shoulder 58 and is contacted by the release ring 49 of the cam 39. The lower rack 59 will move between an upper position shown in FIGS. 2b and 3, and a lower position shown in FIG. 1b.

Figure 1C:
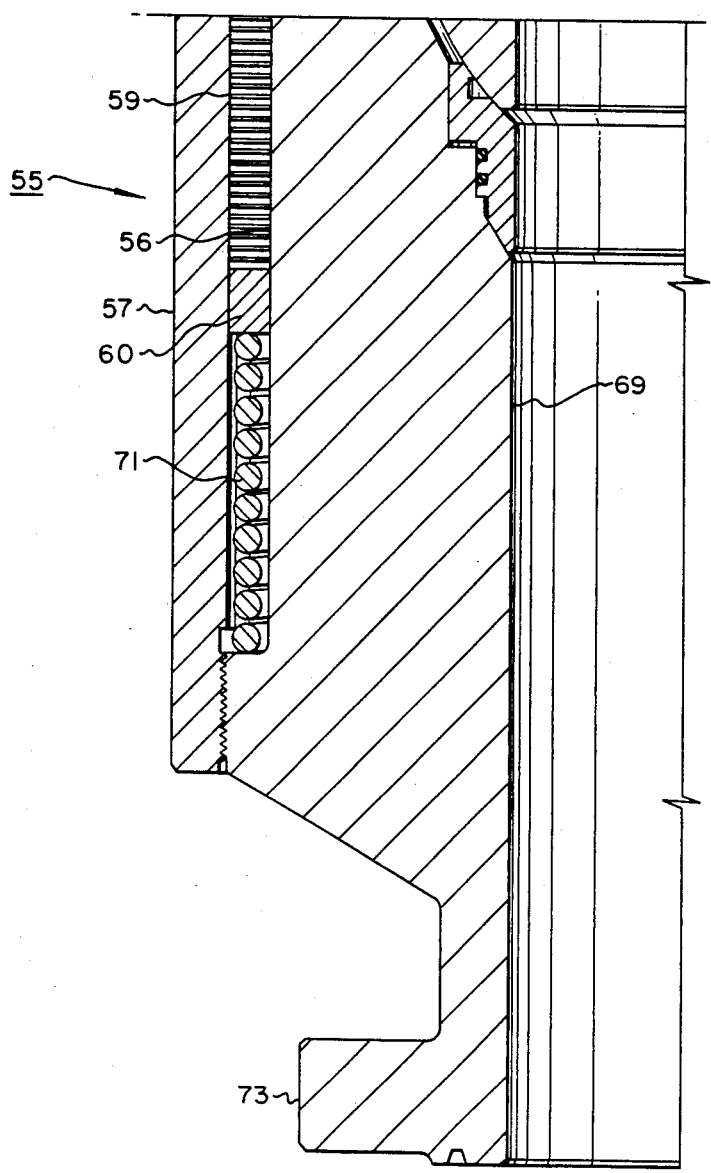

The lower rack 59 is in meshing engagement with a lower pinion gear 61. Lower pinion gear 61 is rigidly mounted to a lower ball valve 63 to rotate the ball valve. The lower ball valve 63 has a passage 65 that communicates with an axial passage 67 in the mandrel 47 for the passage of production fluid. The lower ball valve passage 65 also communicates on the lower side with a passage 69 that extends through the housing 57, shown in FIG. 1c.

Figure 3:
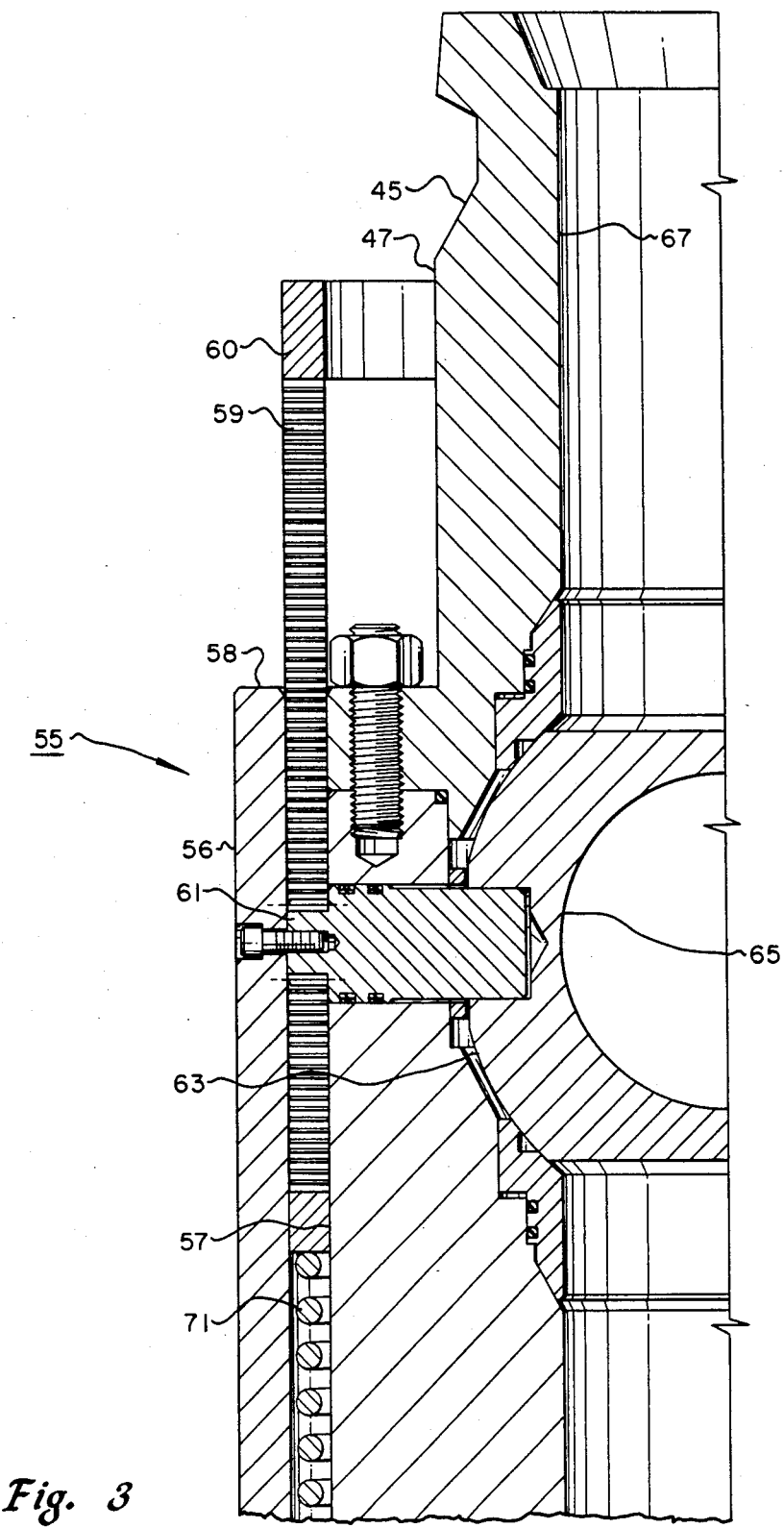

The vertical movement of the lower rack 59 causes the lower ball valve 63 to move between the open position shown in FIG. 1b and the closed position shown in FIGS. 2b and 3. A coil spring 71 is mounted below the cylinder 60 for urging the lower rack 59 to the upper position.

In operation, prior to connecting the upper connector 11 with the lower connector 55, the piston 23 will be in the upper position shown in FIG. 2a. The upper rack 31 will be in the upper position also shown in FIG. 2a. The upper ball valve 35 will be in the open position. The latch dogs 41 will be retracted as shown in FIG. 2b, and the cam 39 will be in the upper position. The lower connector 55 will appear as shown in FIG. 3, with the lower ball valve 63 closed and the lower rack 59 in the upper position.

The upper connector 11 is then lowered over the lower connector 55. The lower portion of the inner housing 13 comprises a receptacle of larger diameter than the mandrel 47, for reception over the mandrel 47, as shown in FIG. 2b.

Then, hydraulic pressure is supplied through line 25 as shown in FIG. 1a. This causes the piston 23 to move downwardly. The upper rack 31 will move downwardly, rotating the upper pinion gear 33 and moving the upper ball valve 35 to the open position shown in FIG. 1a. Simultaneously, as shown in FIG. 1b, the cam 39 will move downwardly, pressing the latch dogs 41 inwardly into engagement with the groove 45. The release ring 49 moves downwardly with the cam 39, pushing the cylinder 60 and the lower rack 59 downwardly. The downward movement of lower rack 59 rotates pinion 61 to open the lower ball valve 63. The coupling is now ready for the passage of fluid.

Should it be necessary to quickly disconnect the coupling, the procedure is reversed. First, hydraulic pressure is supplied to line 27, as shown in FIG. 2a, to raise the piston 23. This raises the upper rack 31, and rotates pinion gear 33 to close the upper ball valve 35. At the same time, as shown in FIG. 2b, the release ring 49 will pull the latch dogs 41 from engagement with the groove 45. The coil spring 71 will push the lower rack 59 upwardly, shown in FIG. 3. This rotates the lower pinion gear 61, closing the lower ball valve 63. Then the upper connector 11 is picked upwardly and removed from the mandrel 47.

Piston 23, piston extension 29, and the associated passage serve as piston means for moving the cam 39 up and down. Cam 39 and release ring 49 serve as cam means for moving the latch dogs 41 in and out. Racks 31 and 59 and pinions 33 and 61 serve as rotating means for rotating the ball valves 35 and 63.

The invention has significant advantages. The coupling is easily connected and disconnected. No hydraulic power is required to close the valve on the lower portion of the coupling, since this is accomplished with the coil spring. The valves simultaneously open and close with the connection and disconnection. The distance between the valves is short to minimize the amount of spillage.

While the invention has been shown in only one of its forms, it should be apparent to those skilled in the art that it is not so limited, but is susceptible to various changes and without departing from the scope of the invention.

I claim:

1. A quick disconnect coupling for a flowline, comprising in combination:

a receptacle and a mandrel connector, each having a flow passage therethrough, the receptacle connector having a receptacle for insertion over a mandrel of the mandrel connector, the mandrel having an annular groove on its sidewall;

a ball valve mounted in the passage of each connector and rotatable between open and closed positions;

rotating means mounted to each ball valve for moving each ball valve between the positions;

a latch member mounted to the receptacle connector for generally radial movement between engaged and released positions with the groove of the mandrel; and means carried by the receptacle connector including a hydraulically actuated piston for moving the latch member between the engaged and released positions, and for engaging the rotating means in response to movement of the piston for moving the rotating means to open and close the valves at the same time the latch member is moved between the engaged and released positions.

2. A quick disconnect coupling for a flowline, comprising in combination:

tubular upper and lower connectors, each having a flow passage therethrough, the upper connector having a downwardly extending receptacle for insertion over an upwardly extending mandrel of the lower connector, the mandrel having an annular groove on its sidewall;

upper and lower ball valves mounted in the passages of the upper and lower connectors, respectively;

rotating means mounted to each ball valve for moving the ball valves between open and closed positions;

a plurality of dogs mounted to the upper connected for radial movement between retracted and engaged positions with the mandrel;

hydraulically actuated piston means carried in the upper connector for vertical movement between upper and lower positions;

the rotating means of the upper ball valve being engaged by the piston means for opening and closing the upper ball valve as the piston means moves downwardly and upwardly;

cam means in the upper connector mounted to the piston means for movement therewith, for moving the dogs between the retracted and engaged positions;

the rotating means of the lower ball valve being engaged by the lower end of the cam means for opening the lower ball valve as the cam means moves downwardly; and spring means for returning the lower ball valve to the closed position in response to the upward movement of the cam means.

3. A quick disconnect coupling, comprising in combination:

tubular upper and lower connectors, each having a flow passage therethrough, the upper connector having a downwardly extending receptacle for insertion over an upwardly extending mandrel of the lower connector;

upper and lower ball valves mounted in the passages of the upper and lower connectors, respectively;

upper and lower pinion gears mounted to the upper and lower ball valves, respectively, for rotation therewith;

upper and lower racks carried in the upper and lower connectors, respectively, in meshing engagement with the upper and lower pinion gears, respectively, for movement between an upper position in which the ball valves are closed and a lower position in which the ball valves are open;

spring means for urging the lower rack to the upper position;

a latch member mounted to the upper connector for movement between retracted and engaged positions with the mandrel;

hydraulically actuated piston means carried in the upper connector for movement between upper and lower positions;

the upper rack being mounted to the piston means for movement therewith between the upper and lower positions, opening and closing the upper ball valve; and cam means in the upper connector mounted to the piston means for movement therewith, for moving the latch member between the retracted and engaged positions, and for moving the lower rack to the lower position to open the lower ball valve as the cam means moves downwardly with the piston means, the spring means forcing the lower rack back to the upper position to close the lower ball valve when the cam means moves upwardly with the piston means.

* * * * *